United States Patent [19]

Lipsky et al.

[11] 3,987,446
[45] Oct. 19, 1976

[54] DIRECTION FINDING APPARATUS
[75] Inventors: Stephen Lipsky, East Hills; Kevin Redmond, Nesconsett; Harry Zacharia, Seaford, all of N.Y.
[73] Assignee: General Instrument Corporation, Clifton, N.J.
[22] Filed: Oct. 27, 1972
[21] Appl. No.: 301,477

[52] U.S. Cl. ............................ 343/120; 343/16 LS
[51] Int. Cl.² ............................................ G01S 3/20
[58] Field of Search ..................... 343/120, 16 LS

[56] References Cited
UNITED STATES PATENTS
2,860,336  11/1958  Earp et al. ........................ 343/120
3,229,287  7/1966  Hovda ............................... 343/120

Primary Examiner—Maynard R. Wilbur
Assistant Examiner—Richard E. Berger

[57] ABSTRACT

The present invention refers to a system intended to locate the direction of a source of electromagnetic radiation and is particularly applicable to radar detection receivers such as those employed in aircraft. This system is capable of performing the direction finding function independent of pulse to pulse variation while using a minimum number of receiving channels, one such channel being used for sequential lobing and the other functioning to normalize the detected sequential lobing signals.

19 Claims, 5 Drawing Figures

DIRECTION FINDING APPARATUS

BACKGROUND OF THE INVENTION

The two principal pulsed emitter direction finding techniques of the prior act are monopulse and sequential lobing. (CONSCAN is considered a special extension of sequential lobing, therefore, sequential lobing as used herein is intended to include CONSCAN). Basically, monopulse determines direction on a single received pulse by comparing the response of a minimum of two receiving channels, but directional accuracy improves when more than two sets of antennas and associated receiving channels are employed, four such sets being typically employed in a given installation. Since the receiving channels process the same pulse, the difference in amplitude from pulse to pulse does not affect the directional measurement. In sequential lobing successive pulses are typically measured with either a single antenna deflected at different angles and feeding into a single receiving channel or a plurality of antennas set at fixed fixed deflection angles which are sequentially switched into a single receiving channel. Through a knowledge of the antenna patterns, the angle of deflection and the amplitude of the received signal from each antenna on successive pulses, the direction of the emitter can be ascertained; however, if the transmitted pulse-to-pulse level varies, the directional accuracy of the sequential lobing technique is deteriorated.

A special form of sequential lobing has been used in an attempt to overcome pulse-to-pulse variations by sequencing through the directional antennas within the time of a single pulse. Since various portions of the same pulse are compared to determine direction, pulse-to-pulse variations are eliminated. Unfortunately, a number of disadvantages occur with this system which seriously reduce its usefulness including errors incurred by pulse amplitude variation within the pulse. Received radar pulses tend to be non-uniform in amplitude over the pulse width. Obvious variations occur during rise and fall time, but other variations also occur during the peak of the pulse. Additional disadvantages are related to the hardware required to switch at the high speed necessary to sequence through the directional antennas during a single pulse width. These include the need for high speed switches, and wide band amplifiers to handle the narrow chopped pulses. Inherent in the use of wide band amplifiers is lower sensitivity. High speed switches often produce transients which are transmitted through the remainder of the receiving system. The present invention avoids these disadvantages of this special form of sequential lobing as well as a number of disadvantages associated with standard sequential lobing and monopulse.

The most significant advantage of the monopulse system is its ability to determine direction independent of pulse-to-pulse variation. Its disadvatnage is the need for a receiving channel for each antenna used. The present invention maintains the advantage of independence from pulse-to-pulse amplitude variation found in monopulse systems while removing its major disadvantage; with the present invention only two channels are required even though more than two directional antennas are used to produce a high degree of direction detection accuracy.

SUMMARY OF INVENTION

The present invention has for its object to provide a direction finding system particularly adapted to pulse systems in such a manner that the directional accuracy is independent of received pulse-to-pulse amplitude variations. Another objective is to provide a direction finding capability with wide angular coverage while using a minimum of receiving channels. A third objective is to produce a direction finding system independent of the uniformity of pattern of a reference omnidirectional antenna. A fourth objective is to achieve directional accuracy without the need for tracked channels.

These objectives are achieved in one embodiment by commutating a first receiving channel about a plurality of fixed directional antennas at the pulse repetition rate of the emitter. The output of a second receiving channel receives its input from an omnidirectional antenna. The output of the omnichannel serves to produce a reference level which is used to normalize variations between the received pulses. Direction finding computations are then carried out as in conventional sequential lobing systems. Commutating the first receiving channel about the various fixed directional channels eliminates the need for a separate receiving channel for each antenna and thereby provides significant economies in cost, size and weight.

The substantially distinguishing feature resides above all in that only two receiving channels are required, even though more than two directional antennas are employed to provide wide angular coverage or greater directional accuracy without adding a separate receiving channel for each antenna.

BRIEF DESCRIPTION OF THE DRAWINGS

To the accomplishment of the above, and to such other objects as may hereinafter appear, the present invention relates to a direction finding system as defined in the appended claims and as described in this specification, taken together with the accompanying drawings, in which:

DESCRIPTION OF THE INVENTION

Figure 1:
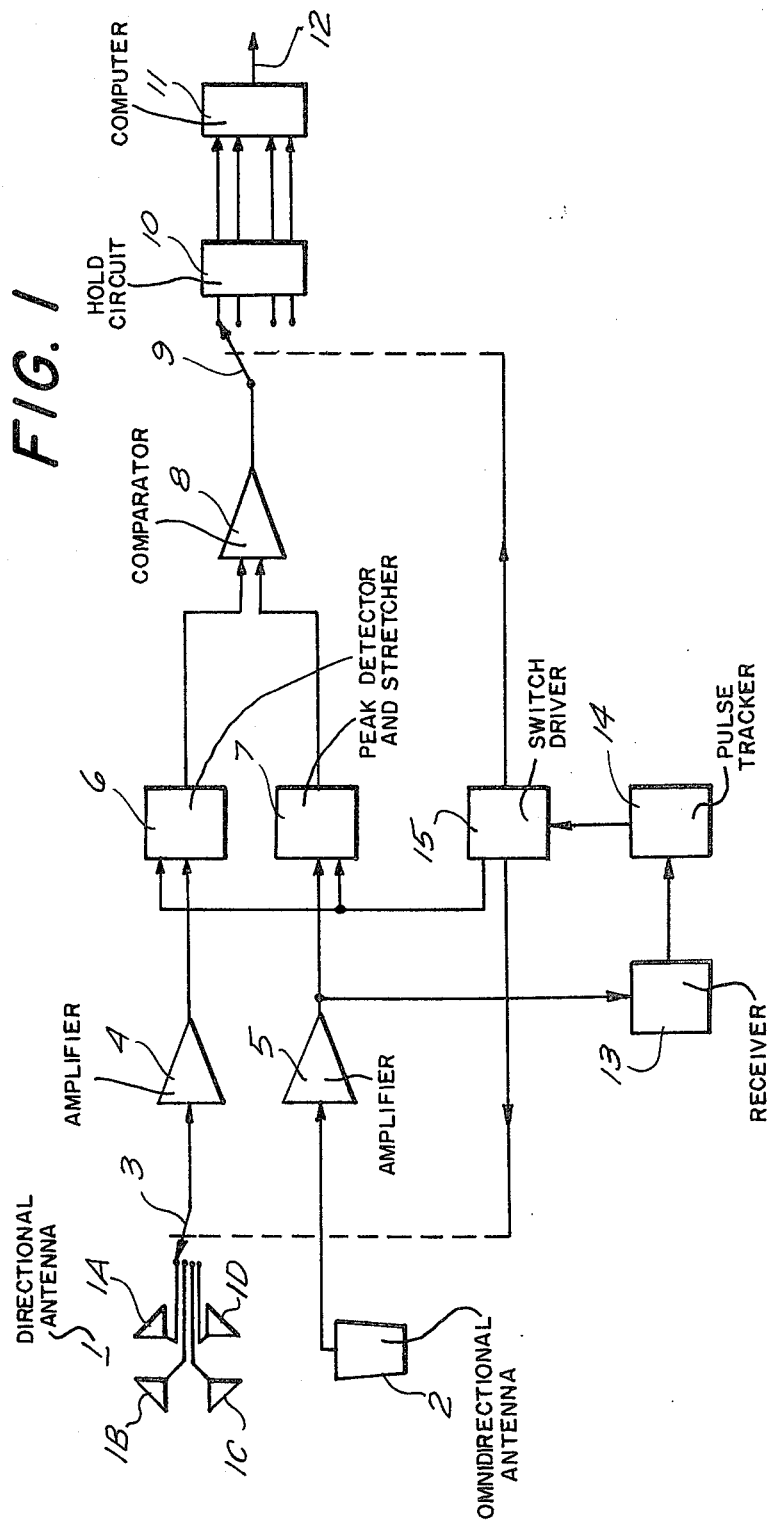
FIGS. 1 and 1A are schematic diagrams of alternative embodiments of the present invention.
Figure 2:
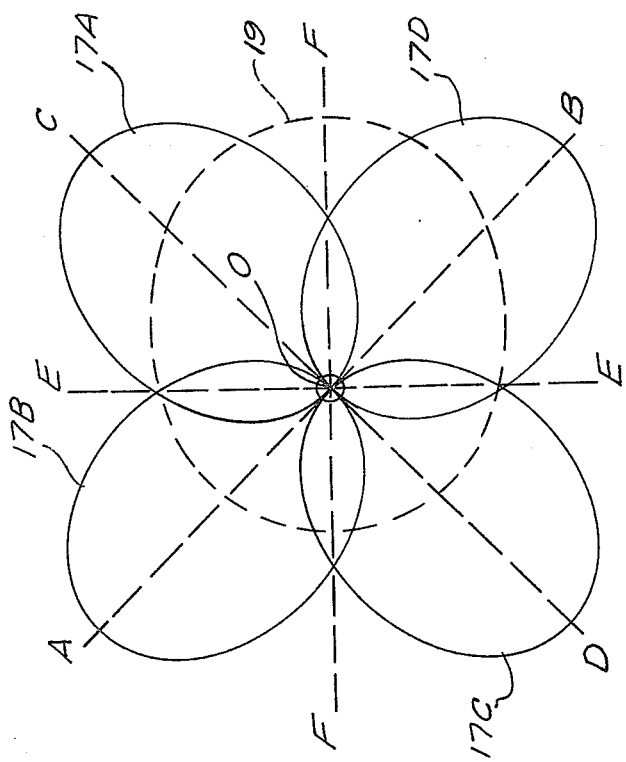
FIG. 2 is a plot of antenna patterns of directional and omnidirectional antennas oriented in a configuration suitable for direction finding in accordance with the system of FIG. 1.

In FIGS. 1 and 2 an exemplary embodiment of the present invention is disclosed which is particularly well adapted for airborne use to determine the direction from which detected radar pulses are being received, but it will be understood that it, and the other embodiments here disclosed, are capable of other uses as well. In addition, it will be recognized that while four directional antennas are disclosed, that is by way of example only, and fewer or greater numbers of such antennas could be employed, as determined by accuracy requirements, spatial and weight limitations, and the like.

Figure 1A:
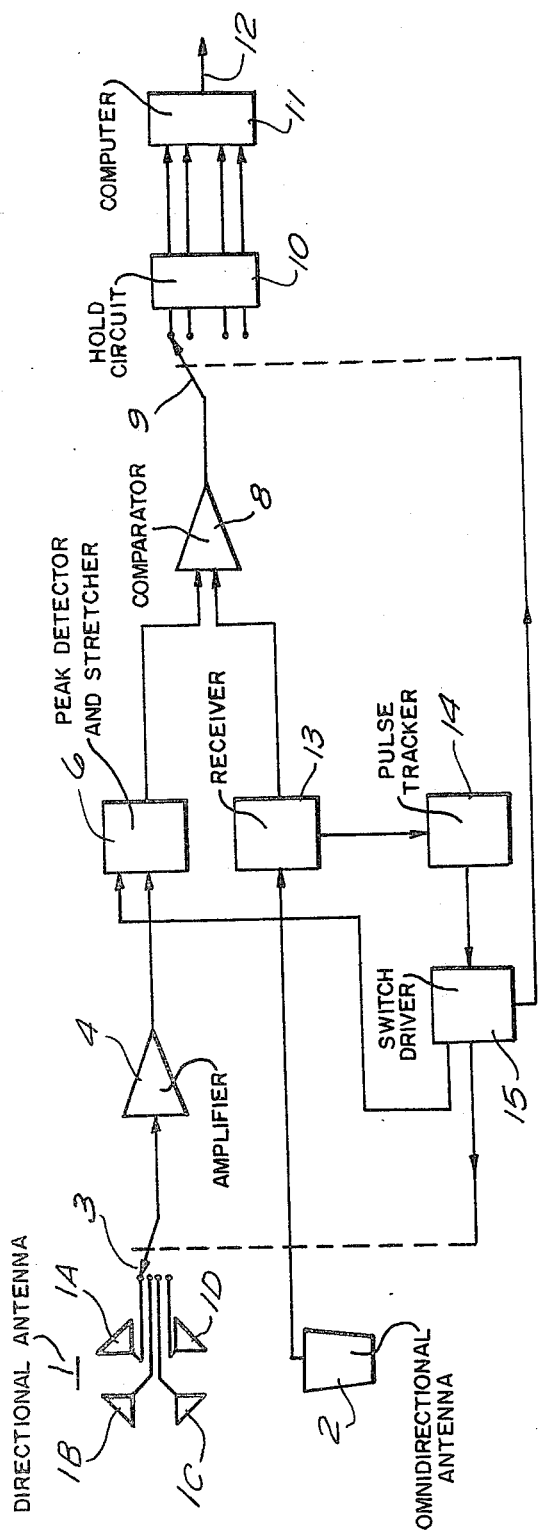

The fixed directional antennas 1A, 1B, 1C and 1D are employed. They are operatively selected sequentially by switch 3 and fed through amplifier 4 and peak detector and stretcher 6 to comparator 8. The output of an omnidirectional antenna 2 is fed through amplifier 5 and peak detector and pulse stretcher 7 to the comparator 8. The output of the comparator 8 is sequentially switched by switch 9 to signal storage units in hold circuit 10. The output of the hold circuit is supplied to a direction finding computer 11 whose output is a signal 12 indicating the direction of the emitter. Computation of the direction is essentially the same as is carried out in the prior art sequential lobing method. Pulse trains are separated and tracked in pulse tracker 14 which is supplied with signals received from the omnidirectional antenna by receiver 13. The pulse tracker drives switch driver 15 in such a way that switches 3 and 9 are synchronously sequenced at the pulse repetition rate of a tracked pulse train. In the interpulse period, the system is blanked from the switch driver circuit by gating off peak detectors and pulse stretchers 6 and 7. In this way, only the desired pulse train is analyzed for direction. The circuitry can be further simplied, as shown in FIG. 1A, by using receiver 13 to perform the function of RF amplifier 5 and peak detector and pulse stretcher 7 as well as supplying pulse tracker 14, thereby requiring only two receivers in the system.

FIG. 2 is a plot of typical antenna patterns of the four direction finding antennas 1A-1D and one omnidirectional antenna, oriented in a configuration suitable for direction finding with the technique of the present invention. Orthogonal axis formed by dashed lines A-B and C-D have the same center point O, but are set off by an angle of 45° from the ortogonal axis formed by lines E-E and F-F. Typical antenna patterns of the four directional antennas 1A-1D shown by contours 17A, 17B, 17C and 17D are boresighted on axes OC, OA, OD and OB, respectively, and thereby provide overlapping coverage over 360° in azimuth. Contour 19, shown in broken lines, represents the pattern of an omnidirectional antenna, here shown as unsymmetrical with respect to the center O. The purpose of showing an omnidirectional pattern which is not symmetrical with respect to the directional antenna patterns is to illustrate that the present invention can operate satisfactorily with such a pattern arrangement as well as with an omnidirectional antenna having a pattern asymmetrical with respect to the center O. This is an important advantage as it is difficult in many applications, and particularly in aircraft installations, to produce a perfectly symmetrically omnidirectional pattern.

Figure 3:
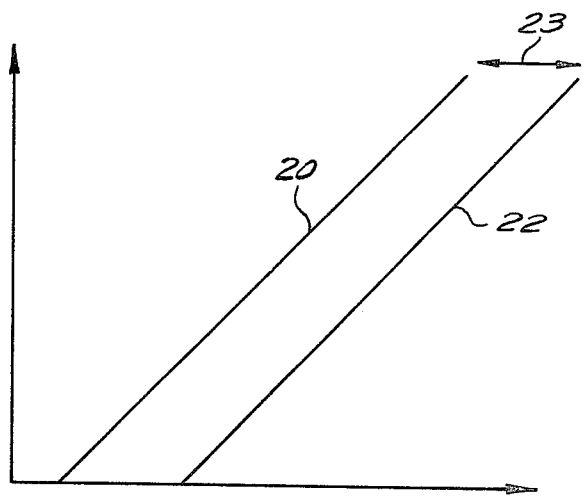
FIGS. 3 and 4 are diagrams illustrating advantages of the present system.
Figure 4:
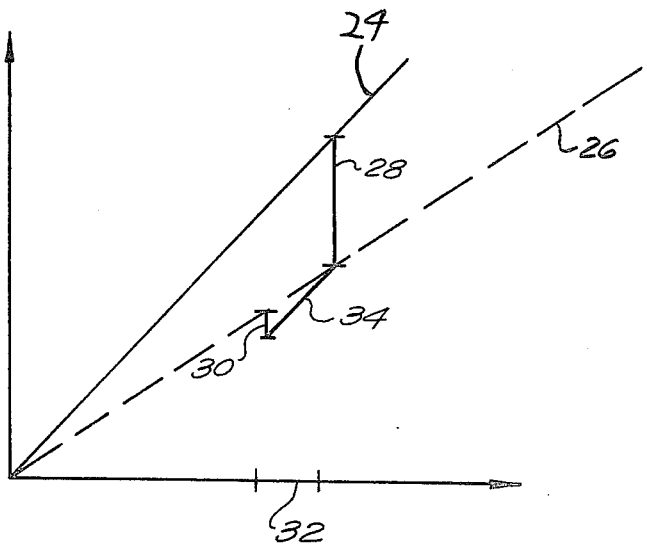

Most existing airborne pulse emitter detection systems either operate with a single omnidirectional channel and provide only an indication of the presence of the emitter or they employ a number of channels, typically four or more, operating simultaneously to provide directional information. Adding a directional capability to an existing single channel system has been found desirable in reducing pulse density and in providing the operator with the added information of emitter site location. The newer, more advanced systems may incorporate the direction finding capability in the initial design using a multiple channel monopulse system to overcome pulse-to-pulse variations and speed the flow of directional information. Where pulse-to-pulse signal variation is the most important factor, savings in cost, size and weight can be achieved with the present invention. The savings can be obtained in adding a directional capability to an existing system or in designing a new system. These savings occur because only two channels are required with the present invention, and as long as the gain of the channels remains constant during the period required for sequencing once through the directional antennas these channels need not track each other prefectly. This is easily seen by referring to FIG. 3 and FIG. 4. FIG. 3 is the plot of characteristic of a typical logarithmic amplifier used in directional systems and the effect of a linear change in gain. The vertical axis represents the output voltage expressed in volts while the horizontal axis represents the input power expressed in dBm. The first plot 20 is parallel to, but displaced from the second plot 22 by an amount of input power 23. A translation in characteristic from 20 to 22 can occur in a logarithmic amplifier if the gain in a preamplifier associated with the logarithmic amplifier changes. This type of change will be shown to have no effect on the directional accuracy of the present invention. FIG. 4 shows the effect of change of a logarithmic amplifier type when there is a change in the gain of the video amplifier. Plots 24 and 26, shown on a coordinate axis identical to FIG. 3, illustrates this type of change.

A serious tracking error shown by a large change in output voltage 28, would occur for a normal monopulse system whether or not the pulse-to-pulse level changed. With the present invention, it will be shown that no error occurs when there is no pulse-to-pulse level change and only a small error 30, when there is a change in pulse level, 32. With a change in gain causing a characteristic transition as shown in FIG. 3, no error in directional accuracy occurs even if the pulse-to-pulse level changes because the characteristics are parallel. A change in pulse level will still give the same change in output voltage.

With the rotational change in characteristic from 24 to 26 in FIG. 4, a small error 30 is introduced only when there is a pulse-to-pulse level change 32. This error is much smaller than the error 28 introduced in a standard monopulse system. The total difference in the characteristic 28 must be taken as this is the error for a standard monopulse system whether or not there is a change in signal level.

For the present invention, there is no error if the pulse-to-pulse level is not changed. This is true because as long as the omnidirectional channel reference remains constant in level, it forms a constant reference which is merely substracted from all the directional channels. When the subtracted outputs are compared, the difference in these levels remains unchanged and without error. It is assumed that both the omnidirectional or reference channel and the directional channel maintain accurate (straight) logarithmic characteristic. The error introduced by a change in the slope of the characteristic is determined by drawing a slope 34 parallel to the first slope 24 in FIG. 4 over the range of input power change 32 and noting the error 30 in output voltage. The error is measured from parallel slope 34 because this slope has no error, as explained in connection with the parallel characteristics shown in FIG. 3. In the example shown in FIG. 4, the error value 30 is approximately one fifth or 14 dB down from the error 28 which would occur in a standard monopulse system. It can be seen from this error comparison that the errors resulting from a rotation in slope are significantly reduced in the present invention when compared to a monopulse system. With a translation of slope or for a constant pulse level, the present invention produces no error while a standard monopulse can produce appreciable errors. In this way, the tracking requirements are reduced or eliminated depending on the type of drift incurred.

Monopulse systems as opposed to the present invention normally required a separate channel for each antenna and each channel must tract at least one other and often every other channel to provide directional accuracy. These are added costly restraints eliminated in the present invention. A further advantage of the present invention is that the pattern of the omnidirectional channel need not be uniform in azimuth nor need it be uniform with frequency.

These advantages will be illustrated with the aid of the system configuration shown in FIG. 1 and the antenna configuration shown in FIG. 2; however, it should be noted that this invention is not limited to these specific configurations alone. The method of normalizing the received pulse as shown in FIG. 1 is to compare each pulse received from a directional antenna with that substantially simultaneously received from the omnidirectional antenna. This process is normally implemented by employing a device such as a logarithmic amplifier at a point in the receiving chain such as at the peak detectors 6 and 7 in FIG. 1. The comparator, in substracting logarithmic signals, in effect takes a ratio of the directional antenna signal to the omnidirectional antenna signal, thereby normalizing the received pulse. Typically, the characteristic of logarithmic amplifiers is expressed in terms of volts per decibels of input power change. When such amplifiers are employed, the output of the comparator will be a voltage representing the ratio in dB of the power received from a directional antenna to that received from the omnidirectional antenna for the same pulse. This ratio, derived from the comparator output, is a function of the direction from which the signal is received on a particular directional antenna. It is independent of the pulse level because this level is received by the directional and omnidirectional antennas simultaneously. By determining the ratio of these signals on the comparator the effect of pulse amplitude variations from one pulse to another is cancelled out.

It will be understood that normalization can be carried out in other ways and by means of other circuitry than what is here specifically disclosed.

The omnidirectional antenna pattern uniformity does not appreciably affect the accuracy of this measurement because essentially only one point of the omnidirectional pattern is used as a reference through the period of sequencing through all directional antennas. This occurs in actual use because the source of detected radiation or emitter of interest is often an appreciable distance from the aircraft and the sequencing is done in a short period. A typical example in aircraft is an emitter with a pulse repetition rate of 2 $KH_z$ located at 30 miles from an aircraft on a tangential course, at a speed of 600 mph. The change in angular bearing over a 2 ms period required to sequence through 4 antennas is less than $10^{-3}$ degrees. Even with emitters as close as 1 mile, the angle traversed is only 0.02 degrees. Therefore, the portion of the omnidirectional pattern used during this period is essentially a single point. In this way, the omnidirectional antenna provides a constant reference even though its pattern may not be uniform when viewed over wider angles.

From this same example, the reason why a directional measurement can be made while sequencing a single channel about the four antennas will be apparent. The change in emitter angle with respect to the aircraft during the period for sequencing is negligibly small. This is especially true when compared to the angle measurement error of prior art direction finding systems, which are normally greater than 5° to the 1 $\sigma$ limits. Therefore, there is a negligible error introduced by making the directional measurement in the sequencing manner of this invention.

In FIG. 1, two identical receiving channels have been shown for the purpose of clarity. In actual use, the second identical channel can be eliminated and its function carried out by the receiver 13. To do this, as shown in FIG. 1A, the RF amplifier 5 and peak detector and stretcher 7 would be deleted. The omnidirectional antenna 2 would feed the receiver 13 directly. The receiver output would then be divided, feeding not only the pulse tracker 14 as in FIG. 1, but also one of the inputs to the comparator 8. In arranging the circuit in this manner, only two receiving channels are required with one of the channels being the receiver 13. Hence, when an existing receiving system is modified to provide a direction finding capability using this invention, only one receiving channel need be added to the existing on-board system.

The pulse tracker 14 has the capability of separating a pulse train out of an environment of many pulse trains. A typical use of pulse tracker is to identify and separate a particular pulse train with a known pulse repetition rate and pulse width. These characteristics for a particular desired pulse train are placed in memory in the tracker prior to use, thereby enabling the tracker to search for, identify and separate the desired pulse train from the environment. Once the pulse tracker acquires a desired pulse train, it predicts when the next pulse in the train will appear through a circuit known as a predictive gate generator or PGG which is contained within the tracker. The output of the PGG produces a discrete signal just prior to the occurrence of the next pulse and in an acquired train through a switch driver 15 sequences switches 3 and 9 in the manner previously described. As a minimum, these switches are maintained at a contact sufficiently long for the pulse to be received and stretched to a uniform length in the pulse stretchers contained in 6 and 7, and to be stored in hold unit 10.

The PGG also produces a discrete signal at the completion of the pulse which is then passed through switch driver 15 to gate off the receiving channels in circuits 6 and 7, thereby preventing extraneous signals and noise from entering the hold unit 10 and affecting the directional measurement.

A number of system variations are possible. A more sophisticated system will employ multiple pulse train trackers, hold units and directional computers and can be used to track many pulse trains simultaneously. Multiple tracking is possible because pulses rarely occur simultaneously. The receiving channels can be used for the shor duration necessary to receive one pulse from a first pulse train and then be switched to another antenna position and another hold unit for a different pulse from a second chain.

Another system improvement would include using direction as a means of reducing pulse density. The number of pulses received is reduced when the signals received from one directional antenna at a time are processed. To accomplish this, the pulse tracker is fed by the receiving channel connected to the directional antennas rather than the channel connected to the omnidirectional antenna.

The present invention can accept a number of component variations as well. In order to provide selectivity and sensitivity a superheterodyne receiver can be employed in the sequenced receiving channel. This receiver can employ a log IF amplifier to obtain a logarithmic output while the omnidirectional channel employs a log video amplifier. Both channels provide video outputs which are a log function of the input signals and both can be processed by the comparator 8. Such a configuration can be applied advantageously in a program to add a directional capability to an existing single channel log video system. The greater sensitivity in the superheterodyne receiver can be effectively employed to overcome such effects as long cable runs or low gain of directional antennas.

A second component variation eliminates the need for an omnidirectional antenna by placing directional couplers in the outputs of the directional antennas and summing the coupled output to produce an equivalent omnidirectional antenna. The resulting pattern is acceptable even if the resulting pattern is not symmetrical. To prevent the effects of different phases being summed and cancelling, each channel can be detected and summed at video.

A third component variation eliminates all the analog circuitry shown after the detectors with digital circuitry. The detector outputs can be converted to a digital format and then this information can be normalized, stored and the direction computed all by digital means. Such processing is well known to those skilled in the art and the equipment necessary to perform these digital functions is readily available. There are additional equivalent means for performing this processing which are considered to be included within the term "computer" as used in the description and claims of this application.

We claim:

1. A process for direction finding comprising the steps of receiving a signal from an emitter on a plurality of directional antennas in sequence, receiving the same signal on a reference antenna, amplitude normalizing the signal received from the directional antennas with respect to the signal received from the reference antenna, and computing from the normalized signals the direction from which said received signal emanates.

2. The process of claim 1, in which said reference antenna is omnidirectional compared to said directional antennas.

3. The process of claim 2, in which said directional antennas are oriented so that their respective directional axes extend in different directions.

4. The process of claim 1, in which said directional antennas are oriented so that their respective directional axes extend in different directions.

5. The process of claim 2, in which said directional antennas are oriented so that their respective directional axes extend in different directions and their combined patterns cover substantially 360° in azimuth.

6. The process of claim 1, in which said directional antennas are oriented so that their respective directional axes extend in different directions and their combined patterns cover substantially 360° in azimuth.

7. Apparatus for finding the direction from which received signals emanate comprising a plurality of directional antennas having outputs, a reference antenna having an output, a first receiving channel having an input and an output, a first switch connected between the outputs of said plurality of directional antennas respectively and the input of said first receiving channel, means for actuating said first switch so as to sequentially connect the outputs of said directional antennas to said input of said first channel, a second receiving channel having an output and an input, means of connecting said output of said reference antenna to said input of said second receiving channel, comparator means having an input and an output, means connecting said comparator means input to the outputs of said first and second receiving channels, said comparator means being effective to normalize a signal received from one of said directional antennas with respect to the signal received from said reference antenna, and means operatively connected to the output of said comparator means for computing from said comparator output the direction from which the signals received by said antennas emanate.

8. The apparatus of claim 7, in which said computing means comprises a signal storage unit having a multicell storage system, each of said cells having an input, and a second switch connected between the output of said comparator and the inputs to said storage cells respectively, and means for actuating said second switch so as to sequentially connect said comparator output to the corresponding storage cells in synchronism with the action of said first switch in connecting said directional antennas sequentially to said input of said first receiving channel.

9. The apparatus of claim 8, in which said first and second receiving channels comprise logarithmic detection means, and said comparator means comprises a substractor effective to determine the ratio of the directional antenna signal to the reference antenna signal.

10. The apparatus of claim 7, in which said first and second receiving channels comprise logarithmic detection means, and said comparator means comprises a substractor effective to determine the ratio of the directional antenna signal to the reference antenna signal.

11. The apparatus of claim 7, in which said reference antenna is an omnidirectional antenna.

12. The apparatus of claim 8, in which said reference antenna is an omnidirectional antenna.

13. The apparatus of claim 9, in which said reference antenna is an omnidirectional antenna.

14. The apparatus of claim 10, in which said reference antenna is an omnidirectional antenna.

15. The apparatus of claim 7, in which said directional antennas comprise fixed location antennas arranged such that their combined patterns cover substantially 360° in azimuth.

16. The apparatus of claim 8, in which said directional antennas comprise fixed location antennas arranged such that their combined patterns cover substantially 360° in azimuth.

17. The apparatus of claim 9, in which said directional antennas comprise fixed location antennas arranged such that their combined patterns cover substantially 360° in azimuth.

18. The apparatus of claim 11, in which said directional antennas comprise fixed location antennas arranged such that their combined patterns cover substantially 360° in azimuth.

19. The apparatus of claim 15, in which said directional antennas comprise fixed location antennas arranged such that their combined patterns cover substantially 360° in azimuth.

* * * * *